(12) United States Patent
Wingett et al.

(10) Patent No.: US 9,182,022 B2
(45) Date of Patent: Nov. 10, 2015

(54) BALL SCREW ACTUATOR INCLUDING A STOP WITH AN INTEGRAL GUIDE

(71) Applicant: HONEYWELL INTERNATIONAL INC., Morristown, NJ (US)

(72) Inventors: Paul T. Wingett, Mesa, AZ (US); John Perek, Phoenix, AZ (US); Kellan Geck, Chandler, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 54 days.

(21) Appl. No.: 13/653,601

(22) Filed: Oct. 17, 2012

(65) Prior Publication Data

US 2014/0102230 A1    Apr. 17, 2014

(51) Int. Cl.
| F16H 3/06 | (2006.01) |
| F16H 25/20 | (2006.01) |
| F16H 25/22 | (2006.01) |

(52) U.S. Cl.
CPC ........ *F16H 25/2015* (2013.01); *F16H 25/2204* (2013.01); *F16H 2025/2081* (2013.01)

(58) Field of Classification Search
CPC ......... F16H 25/22; F16H 25/20; F16H 25/24; F16H 25/2015; F16H 25/2204; F16H 2025/2081
USPC ............................................. 74/2, 23, 37, 39
See application file for complete search history.

(56) References Cited

U.S. PATENT DOCUMENTS

| 2,479,019 | A |   | 8/1949 | Ochtman |
| 2,497,424 | A |   | 2/1950 | Terdina et al. |
| 3,202,008 | A | * | 8/1965 | Geyer .......................... 74/89.37 |
| 3,374,688 | A |   | 3/1968 | Schildmeier |
| 3,766,798 | A |   | 10/1973 | Kusiak |
| 4,192,398 | A | * | 3/1980 | Hunt ............................ 180/178 |
| 4,398,109 | A | * | 8/1983 | Kuwako et al. ................ 310/80 |

(Continued)

FOREIGN PATENT DOCUMENTS

FR    2960515 A1    12/2011

OTHER PUBLICATIONS

"The importance of ballscrew end fixity", Aug. 1, 2000, Motion System Design; Penton Media, Inc.; http://motionsystemdesign.com/linear-motion/importance-ballscrew-end-fixity-0894/.

(Continued)

*Primary Examiner* — William Kelleher
*Assistant Examiner* — Zakaria Elahmadi
(74) *Attorney, Agent, or Firm* — Ingrassia Fisher & Lorenz, P.C.

(57) ABSTRACT

An actuator includes a housing assembly, a ball nut, a ball screw, and a ball screw stop. The ball nut is rotationally mounted in the housing assembly, is adapted to receive an input torque, and is configured, upon receipt thereof, to rotate and supply a drive force. The ball screw is mounted within the housing assembly and extends through the ball nut. The ball screw has a first end and a second end, and is coupled to receive the drive force from the ball nut. The ball screw is configured, upon receipt of the drive force, to selectively translate between a stow position and a deploy position. The ball screw stop is mounted on the ball screw to translate therewith and is configured to at selectively engage the housing assembly while the ball screw is translating, and engage the ball nut when the ball screw is in the deploy position.

16 Claims, 5 Drawing Sheets

(56) References Cited

U.S. PATENT DOCUMENTS

| | | | |
|---|---|---|---|
| 4,671,127 A | 6/1987 | Yamaguchi et al. | |
| 5,214,972 A | 6/1993 | Larson et al. | |
| 5,454,278 A | 10/1995 | Kasuga | |
| 5,735,456 A * | 4/1998 | Marin et al. | 236/75 |
| 6,240,796 B1 * | 6/2001 | Yamada | 74/89.23 |
| 6,334,370 B1 | 1/2002 | Sonoda et al. | |
| 6,564,660 B2 | 5/2003 | Kawamura et al. | |
| 7,073,406 B2 | 7/2006 | Garrec | |
| 7,093,510 B2 | 8/2006 | Andreasson | |
| 7,124,419 B2 * | 10/2006 | Fujibayashi | 720/663 |
| 7,610,828 B2 * | 11/2009 | Wingett et al. | 74/424.78 |
| 8,109,165 B2 * | 2/2012 | Himmelmann | 74/89.37 |
| 8,141,445 B2 | 3/2012 | Yoshioka et al. | |
| 8,495,924 B2 * | 7/2013 | Fukano et al. | 74/89.23 |
| 2006/0081079 A1 * | 4/2006 | Jaecklin et al. | 74/89.23 |
| 2009/0193915 A1 * | 8/2009 | Wang | 74/89.23 |
| 2009/0260463 A1 * | 10/2009 | Fukano et al. | 74/89.33 |
| 2011/0011191 A1 * | 1/2011 | Osterlaenger et al. | 74/89.23 |
| 2011/0096808 A1 * | 4/2011 | Hwang et al. | 374/141 |
| 2012/0090418 A1 * | 4/2012 | Barthlein et al. | 74/424.81 |
| 2012/0222510 A1 * | 9/2012 | Winther et al. | 74/89.23 |
| 2012/0234117 A1 * | 9/2012 | Oswald | 74/89.39 |
| 2012/0247240 A1 * | 10/2012 | Kawahara et al. | 74/89.23 |
| 2013/0333499 A1 * | 12/2013 | Kim | 74/89.23 |

OTHER PUBLICATIONS

EP Search Report for EP13179328.3-1752 dated Feb. 18, 2014.
EP Examination Report for EP 13179328.3-1752 dated Mar. 5, 2014.

* cited by examiner

BALL SCREW ACTUATOR INCLUDING A STOP WITH AN INTEGRAL GUIDE

STATEMENT REGARDING FEDERALLY SPONSORED RESEARCH OR DEVELOPMENT

This invention was made with Government support under contract number NAS15-10000 awarded by NASA. The Government has certain rights in this invention.

TECHNICAL FIELD

The present invention generally relates to actuators, and more particularly relates to linear, ball screw actuators that include stops with integral guides.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. Many different types of actuator configurations presently exist. One particular type of actuator is a linear electro-mechanical actuator (EMA). A typical linear EMA includes a power drive unit, an actuation member, and a translation member. The power drive unit, such as a motor, is configured to supply a drive torque to the actuation member, which in turn causes the translation member to translate.

One particular type of linear EMA is a ball screw actuator. This type of actuator includes a ball screw and a ball nut. The ball nut is mounted on, and is configured to rotate relative to, the ball screw. In some configurations, the ball screw is the actuation member, and the ball nut is the translation member. With these configurations, the power drive unit drives the ball screw, which causes the ball nut to translate. In other configurations, the ball nut is the actuation member, and the ball screw is the translation member. With these configurations, the power drive unit drives the ball nut, which causes the ball screw to translate.

With the latter configuration, in which the ball screw is the translation member, the ball screw can vibrate while it is translating, and also deflect at the limits of translational stroke. These factors, both individually and collectively, can deleteriously impact overall actuator assembly performance and lifetime.

Hence, there is a need for mechanism that at least inhibits ball screw vibration during translation and/or minimizes ball screw deflection at the limits of translation stroke. The present invention addresses at least these needs.

BRIEF SUMMARY

In one embodiment, an actuator includes a housing assembly, a ball nut, a ball screw, and a ball screw stop. The ball nut is rotationally mounted in the housing assembly, is adapted to receive an input torque, and is configured, upon receipt thereof, to rotate and supply a drive force. The ball screw is mounted within the housing assembly and extends through the ball nut. The ball screw has a first end and a second end, and is coupled to receive the drive force from the ball nut. The ball screw is configured, upon receipt of the drive force, to selectively translate between a stow position and a deploy position. The ball screw stop is mounted on the ball screw to translate therewith. The ball screw stop is configured to at least selectively engage the housing assembly while the ball screw is translating between the stow position and deploy position, and engage the ball nut when the ball screw is in the deploy position.

In another embodiment, an actuator includes a housing assembly, a ball nut, a motor, a ball screw, and a ball screw stop. The ball nut is rotationally mounted in the housing assembly and has a first dog stop formed on an end thereof. The ball nut is adapted to receive an input torque and is configured, upon receipt thereof, to rotate and supply a drive force. The motor is coupled to the ball nut and is configured to selectively supply the drive torque thereto. The ball screw is mounted within the housing assembly and extends through the ball nut. The ball screw has a first end and a second end, and is coupled to receive the drive force from the ball nut. The ball screw is configured, upon receipt of the drive force, to selectively translate between a stow position and a deploy position. The ball screw stop is mounted on the ball screw to translate therewith and has a second dog stop formed on an end thereof. The ball screw stop is configured to at least selectively engage the housing assembly while the ball screw is translating between the stow position and deploy position. The second dog stop is configured to mate with and engage the first dog stop when the ball screw is in the deploy position.

In yet another embodiment, an actuator includes a housing assembly, a ball nut, a motor, a ball screw, and a ball screw stop. The ball nut is rotationally mounted in the housing assembly and has a first dog stop formed on a first end thereof. The ball nut is adapted to receive an input torque and is configured, upon receipt thereof, to rotate and supply a drive force. The motor is coupled to the ball nut and is configured to selectively supply the drive torque thereto. The ball screw is mounted within the housing assembly and extends through the ball nut. The ball screw has a first end and a second end, and is coupled to receive the drive force from the ball nut. The ball screw is configured, upon receipt of the drive force, to selectively translate between a stow position and a deploy position. The ball screw stop is mounted on the ball screw to translate therewith. The ball screw stop is configured to at least selectively engage the housing assembly while the ball screw is translating between the stow position and deploy position, and engage the ball nut when the ball screw is in the deploy position. The ball screw stop includes a stop structure and a guide structure. The stop structure is mounted directly on the ball screw, and has a first end, a second end, and an outer surface. The guide structure is mounted directly on and surrounds at least a portion of the outer surface of the stop structure.

Furthermore, other desirable features and characteristics of the actuator will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
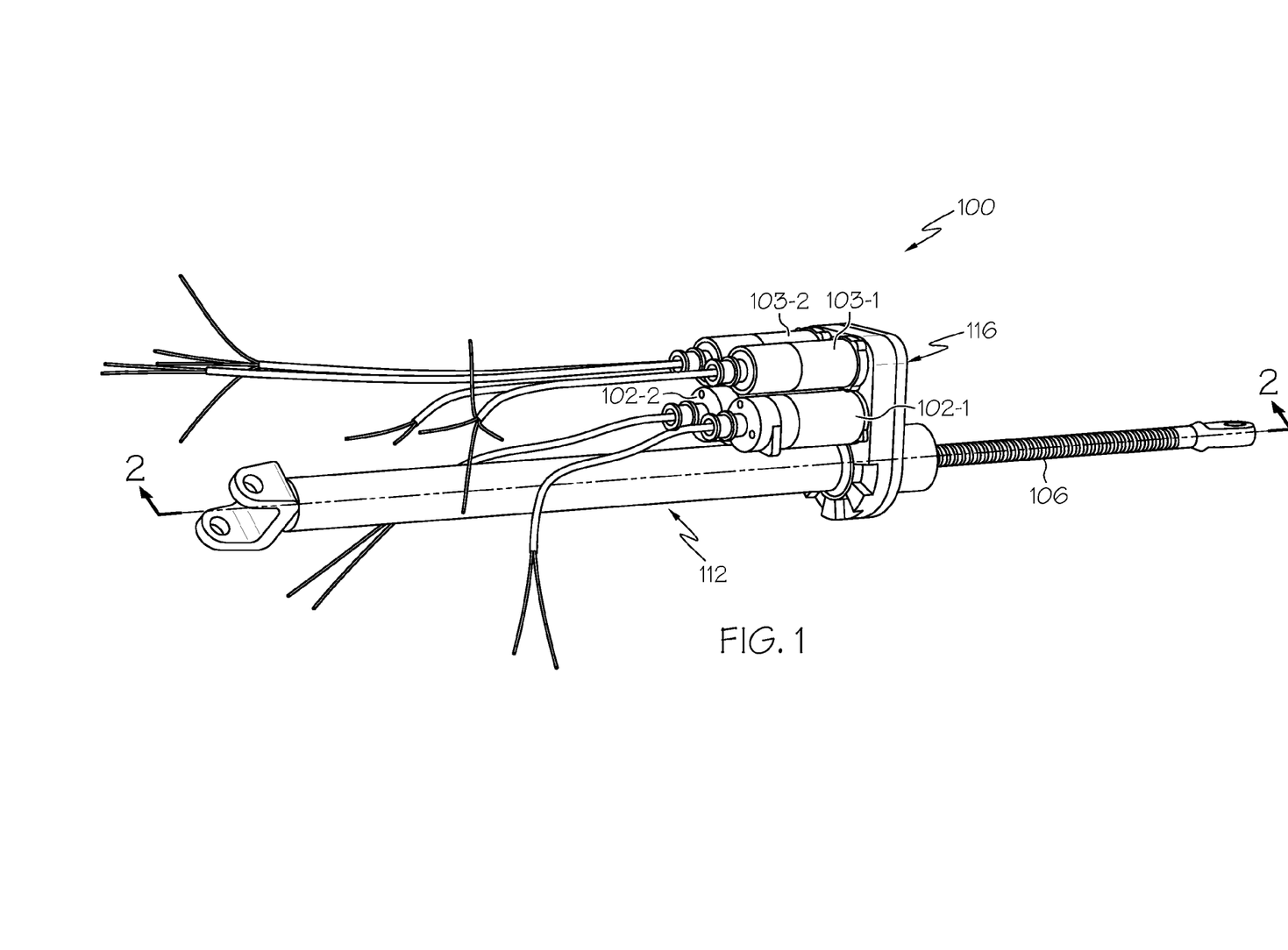
FIG. 1 depicts a plan view of one embodiment of a ball screw actuator assembly.
Figure 2:
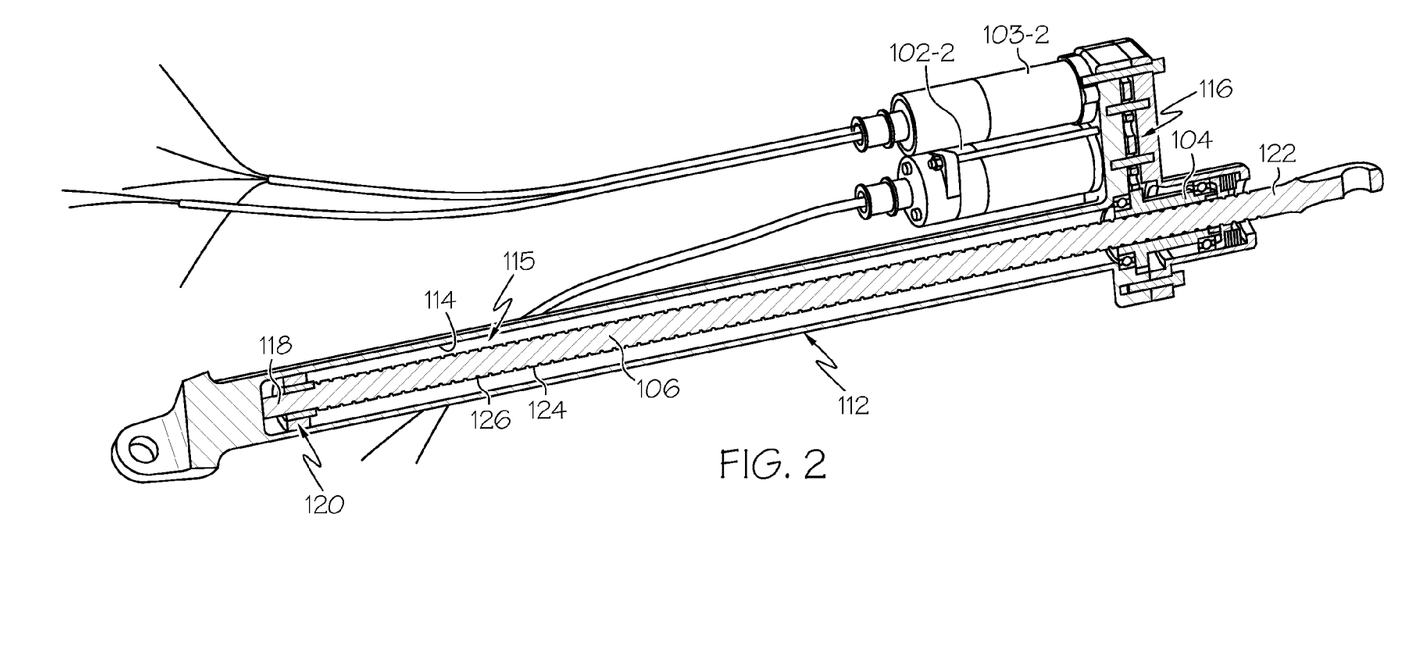
FIG. 2 depicts a cross section view taken along line 2-2 in FIG. 1.

Referring to FIGS. 1 and 2, an exemplary ball screw actuator 100 is depicted. The depicted actuator 100 is a linear electromechanical (EMA) actuator and includes a pair of motors 102 (102-1, 102-2), a ball nut 104, and a ball screw 106, all disposed at least partially within or on an actuator housing assembly 112. The actuator housing assembly 112 includes an inner surface 114 that defines a cavity 115, within which the ball nut 104 and at least a portion of the ball screw 106 are disposed.

The motors 102 are mounted on the housing assembly 112, and may be variously configured and implemented. For example, each motor 102 may be implemented using any one of numerous types of hydraulic motors, pneumatic motors, or electric motors. In the depicted embodiment, each is implemented using an electric motor, which may be any one of numerous types of electric motors, such as an AC motor, a brushed DC motor, or a brushless DC motor, just to name a few. No matter how the motors 102 are specifically implemented, each is coupled to the ball nut 104, preferably via a gear set 116, and each is configured to selectively supply a drive torque to the ball nut 104. Although two, redundant motors 102 are depicted in FIG. 1, it will be appreciated that the actuator 100 could be implemented with more or less than this number of motors.

Before proceeding further, it is noted that the depicted actuator 100 additionally includes a pair of position sensors 103 (103-1, 103-2). The position sensors 103, like the motors 102, are mounted on the housing assembly 112 and may be variously configured and implemented. In the depicted embodiment, however, the position sensors 103 are each implemented using a resolver configured to provide an output signal representative of actuator position. Though not depicted in FIGS. 1 and 2, the resolvers 103 are each configured with a reduction gear head to limit the rotations to under one revolution.

Figure 3:
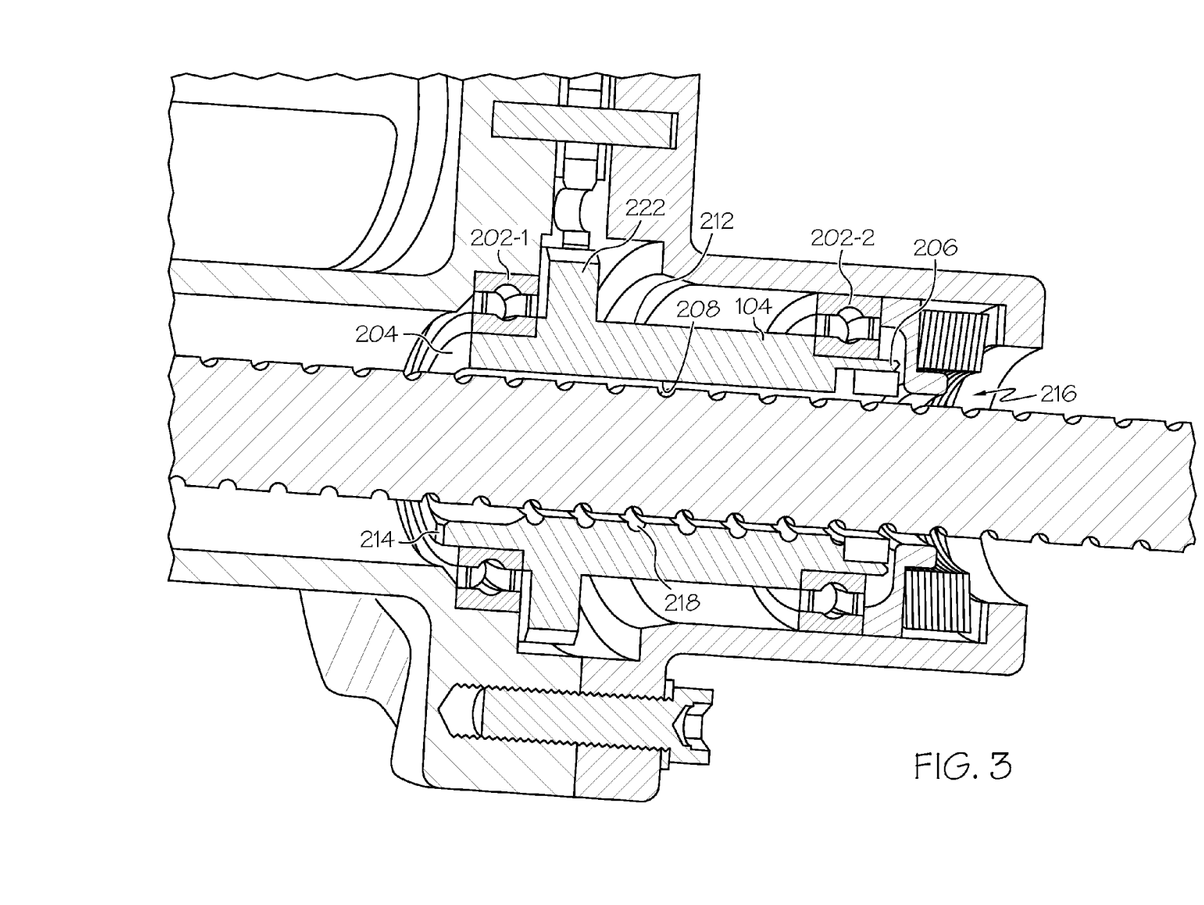
FIG. 3 depicts a close-up cross section view of a ball nut and a portion of a ball screw that may be used to implement the actuator assembly of FIGS. 1 and 2.

The ball nut 104, as shown most clearly in FIG. 3, is rotationally mounted in the housing assembly 112, via two bearing assemblies 202 (202-1, 202-2). The ball nut 104 is coupled to receive the input torque supplied from one or both of the motors 102 and is configured, upon receipt thereof, to rotate and supply a drive force to the ball screw 106. The ball nut 104 may be variously configured and implemented, but includes at least a first end 204, a second end 206, an inner surface 208, and an outer surface 212. The ball nut first end 204 has a first dog stop 214 formed thereon, the purpose of which will be described further below. The ball nut inner surface 208 defines a passageway 216 that extends through the ball nut 104 between the first and second ends 204, 206, and has a plurality of helical ball grooves (or "threads") 218 formed thereon. The ball nut outer surface 212 has an input gear 222 coupled thereto, and extending therefrom, proximate the ball nut first end 204. The input gear 222 receives, via the gear set 116, the rotational drive torque supplied from one or both of the motors 102, which in turn causes the ball nut 104 to rotate and supply the drive force to the ball screw 106.

The ball screw 106 is mounted within the housing assembly 112 and extends through the ball nut passageway 216. The ball screw 106 is configured, upon receipt of the drive force supplied thereto from the ball nut 104, to selectively translate between a stow position, which is the position depicted in FIG. 2, and a deploy position. As illustrated in FIG. 2, the ball screw 106 includes a first end 118, a second end 122, and an outer surface 124. The ball screw outer surface 124 has a single or a plurality of ball grooves (or "threads") 126 formed thereon. A plurality of non-illustrated recirculating balls are disposed within the ball nut ball grooves 218, and in selected ones of the ball screw ball grooves 126. The balls, in combination with the ball grooves 126, 218, convert the rotational movement of the ball nut 104 into the translational movement of the ball screw 106. It will be appreciated that the direction in which the ball screw 106 travels will depend on the direction in which the ball nut 104 rotates.

As FIG. 2 further depicts, a ball screw stop 120 is mounted on the ball screw 106 in a manner that causes the ball screw stop 120 to translate with ball screw 106. The ball screw stop 120 may be variously implemented, but is configured to at least selectively engage the housing assembly 112, and more particularly the housing assembly inner surface 114, while the ball screw 106 is translating between the stow position and deploy position. The ball screw stop 120 is additionally configured to engage the ball nut 104 when the ball screw 106 is in the deploy position. The ball screw stop 120, upon engaging the ball nut 104, prevents rotation of the ball nut in one direction, while allowing the rotation of the ball nut in an opposite direction. It will be appreciated that the ball screw stop 120 may be variously configured to implement this functionality. One particular embodiment of the ball screw stop 120 is depicted more clearly in FIG. 4, and with reference thereto will now be described.

Figure 4:
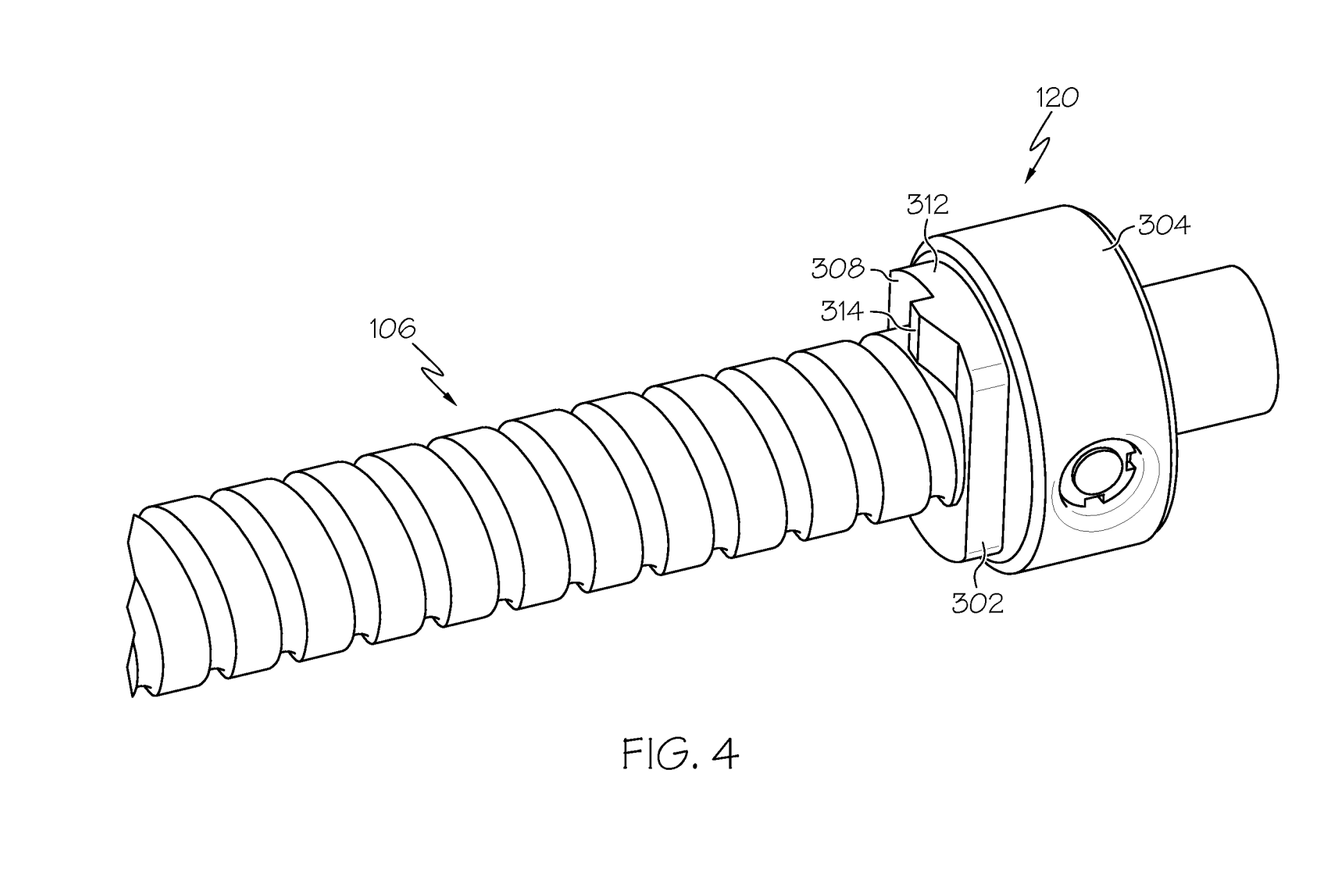
FIG. 4 depicts a close-up plan view of an embodiment of a ball screw stop mounted on a ball screw.
Figure 5:
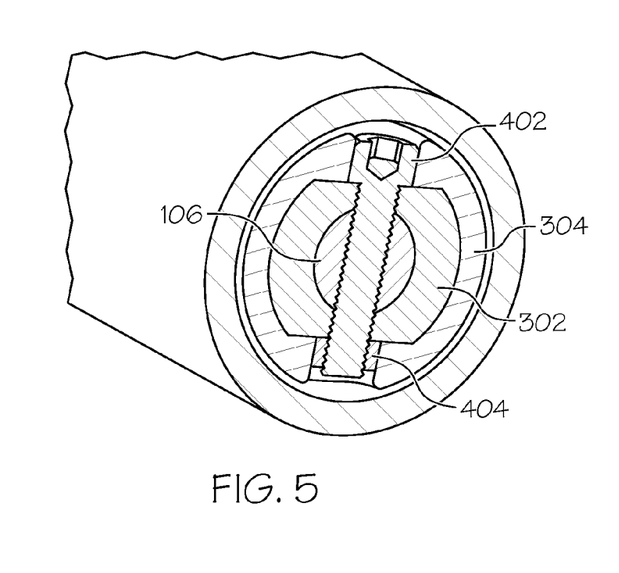
FIGS. 5 and 6 depict cross section plan views of the ball screw stop depicted in FIG. 3.

The depicted ball screw stop 120 includes a stop structure 302 and a guide structure 304. The stop structure 302 is mounted directly on the ball screw 106, proximate its first end 118, and has a first end 306 (see FIG. 6), a second end 308, and an outer surface 312. The second end 308 has a second dog stop 314 formed thereon. The second dog stop 314 is configured to mate with the first dog stop 214 that is formed on the ball nut 104 when the ball screw stop 120 engages the ball nut 104. The guide structure 304 is mounted directly on, and surrounds at least a portion of, the outer surface 312 of the stop structure 120. As shown even more clearly in FIGS. 5 and 6, the ball screw stop 120 is mounted on the ball screw 106 via a fastener 402 that extends through the stop structure 302, the guide structure 304, and the ball screw 106, and is held in place via a nut 404.

Figure 6:
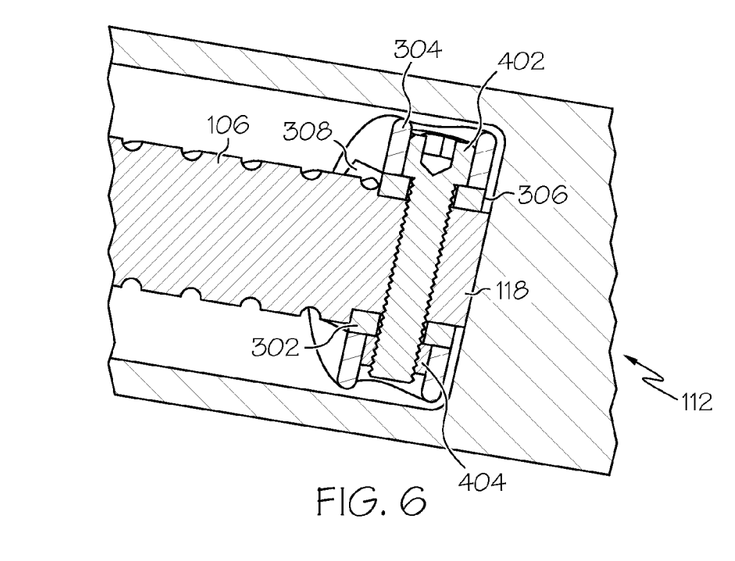

The ball screw stop 120 is configured such that there is a slight gap between the guide structure 304 and the inner surface 114 of the housing assembly 112. Thus, the guide structure 304 will only selectively engage the inner surface 114 while the ball screw 106 is translating and will minimize deflection of the ball screw 106 at the limits of its stroke (i.e., the stow position and deploy position). The first and second dog stops 214, 314, as noted above, will mate and engage each other when the ball screw 106 is moved to the fully deployed position, and will prevent further rotation of the ball nut 104 in the direction that causes the ball screw 106 to translate toward the deploy position. As depicted in FIG. 6, when the ball screw 106 is in the fully retracted position, the first end 306 of the stop structure 302 engages the inner surface 114 of the housing assembly 112.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator, comprising:
   a housing assembly;
   a ball nut rotationally mounted in the housing assembly, the ball nut adapted to receive an input torque and configured, upon receipt thereof, to rotate and supply a drive force;
   a ball screw mounted within the housing assembly and extending through the ball nut, the ball screw having a first end and a second end, and coupled to receive the drive force from the ball nut, the ball screw configured, upon receipt of the drive force, to selectively translate between a stow position and a deploy position; and
   a ball screw stop mounted on the ball screw to translate therewith, the ball screw stop (i) selectively engaging the housing assembly while the ball screw is translating between the stow position and deploy position and (ii) engaging the ball nut when the ball screw is in the deploy position,
   wherein the ball screw stop comprises:
      a stop structure mounted directly on the ball screw, the stop structure having a first end, a second end, and an outer surface;
      a guide structure mounted directly on and surrounding at least a portion of the outer surface of the stop structure, and
      a fastener extending through the stop structure, the guide structure, and the ball screw.

2. The actuator of claim 1, wherein:
   the ball nut comprises a first dog stop formed on a first end thereof; and
   the ball screw stop comprises a second dog stop formed on a second end thereof, the first dog stop and the second dog stop configured to mate when the ball screw stop engages the ball nut.

3. The actuator of claim 2, wherein the ball screw stop, upon engaging the ball nut, prevents rotation of the ball nut in one direction while allowing the rotation of the ball nut in an opposite direction.

4. The actuator of claim 1, wherein:
   the housing assembly includes an inner surface that defines a cavity;
   the ball screw includes a first end and a second end, the first end disposed within the cavity, the second end disposed outside the cavity; and
   the ball screw stop is disposed at least proximate the first end.

5. The actuator of claim 1, wherein the guide structure selectively engages the inner surface of the housing while the ball screw is translating.

6. The actuator of claim 1, further comprising:
   a motor coupled to the ball nut and configured to selectively supply the drive torque thereto.

7. The actuator of claim 6, further comprising:
   a gear set coupled between the motor and the ball nut.

8. An actuator, comprising:
   a housing assembly;
   a ball nut rotationally mounted in the housing assembly and having a first dog stop formed on an end thereof, the ball nut adapted to receive an input torque and configured, upon receipt thereof, to rotate and supply a drive force;
   a motor coupled to the ball nut and configured to selectively supply the drive torque thereto;
   a ball screw mounted within the housing assembly and extending through the ball nut, the ball screw having a first end and a second end, and coupled to receive the drive force from the ball nut, the ball screw configured, upon receipt of the drive force, to selectively translate between a stow position and a deploy position; and
   a ball screw stop mounted on the ball screw to translate therewith and having a second dog stop formed on an end thereof, the ball screw stop configured to at least selectively engage the housing assembly while the ball screw is translating between the stow position and deploy position, the second dog stop configured to mate with and engage the first dog stop when the ball screw is in the deploy position,
   wherein the ball screw stop comprises:
      a stop structure mounted directly on the ball screw, the stop structure having a first end, a second end, and an outer surface;
      a guide structure mounted directly on and surrounding at least a portion of the outer surface of the stop structure; and
      a fastener extending through the stop structure, the guide structure, and the ball screw.

9. The actuator of claim 8, wherein the ball screw stop, upon engaging the ball nut, prevents rotation of the ball nut in one direction while allowing the rotation of the ball nut in an opposite direction.

10. The actuator of claim 8, wherein:
the housing assembly includes an inner surface that defines a cavity;
the ball screw includes a first end and a second end, the first end disposed within the cavity, the second end disposed outside the cavity; and
the ball screw stop is disposed at least proximate the first end.

11. The actuator of claim 8, wherein the guide structure selectively engages the inner surface of the housing while the ball screw is translating.

12. An actuator, comprising:
a housing assembly;
a ball nut rotationally mounted in the housing assembly and having a first dog stop formed on a first end thereof, the ball nut adapted to receive an input torque and configured, upon receipt thereof, to rotate and supply a drive force;
a motor coupled to the ball nut and configured to selectively supply the drive torque thereto;
a ball screw mounted within the housing assembly and extending through the ball nut, the ball screw having a first end and a second end, and coupled to receive the drive force from the ball nut, the ball screw configured, upon receipt of the drive force, to selectively translate between a stow position and a deploy position;
a ball screw stop mounted on the ball screw to translate therewith, the ball screw stop configured to (i) at least selectively engage the housing assembly while the ball screw is translating between the stow position and deploy position and (ii) engage the ball nut when the ball screw is in the deploy position, the ball screw stop comprising:
a stop structure mounted directly on the ball screw, the stop structure having a first end, a second end, and an outer surface,
a guide structure mounted directly on and surrounding at least a portion of the outer surface of the stop structure, and
a fastener extending through the stop structure, the guide structure, and the ball screw.

13. The actuator of claim 12, wherein:
the ball nut comprises a first dog stop formed on a first end thereof; and
the ball screw stop comprises a second dog stop formed on a second end thereof, the first dog stop and the second dog stop configured to mate when the ball screw stop engages the ball nut.

14. The actuator of claim 12, wherein the ball screw stop, upon engaging the ball nut, prevents rotation of the ball nut in one direction while allowing the rotation of the ball nut in an opposite direction.

15. The actuator of claim 12, further comprising:
a gear set coupled between the motor and the ball nut.

16. The actuator of claim 12, wherein:
the housing assembly includes an inner surface that defines a cavity;
the ball screw includes a first end and a second end, the first end disposed within the cavity, the second end disposed outside the cavity;
the ball screw stop is disposed at least proximate the first end; and
the guide structure selectively engages the inner surface of the housing while the ball screw is translating.

* * * * *